United States Patent [19]

Cheng

[11] Patent Number: 5,235,470
[45] Date of Patent: * Aug. 10, 1993

[54] ORTHOGONAL PARABOLIC REFLECTOR SYSTEMS

[76] Inventor: Dah Y. Cheng, 12950 Cortez La., Los Altos Hills, Calif. 94022

[*] Notice: The portion of the term of this patent subsequent to Aug. 6, 2008 has been disclaimed.

[21] Appl. No.: 740,586

[22] Filed: Aug. 5, 1991

Related U.S. Application Data

[63] Continuation-in-part of Ser. No. 455,518, Dec. 21, 1989, Pat. No. 5,037,191.

[51] Int. Cl.$^5$ ............................................ G02B 5/10
[52] U.S. Cl. .................................. 359/852; 359/867; 359/869; 372/99; 362/296; 362/347; 362/350
[58] Field of Search ............... 359/851, 852, 858, 859, 359/867, 868, 869; 372/99, 101; 362/296, 341, 347, 350; 181/148, 153, 155, 175, 177, 198

[56] References Cited

U.S. PATENT DOCUMENTS

| | | | |
|---|---|---|---|
| 2,252,246 | 8/1941 | Bergmans et al. | |
| 3,899,672 | 8/1975 | Levi-Setti | 359/869 |
| 3,923,381 | 12/1975 | Winston | 359/852 |
| 4,003,638 | 1/1977 | Winston | 359/852 |
| 4,173,778 | 11/1979 | Snavely et al. | 362/350 |
| 4,612,608 | 9/1986 | Peitz | |
| 4,855,886 | 8/1989 | Eijkelenboom et al. | 359/869 |
| 5,037,191 | 8/1991 | Cheng | 359/858 |

*Primary Examiner*—Bruce Y. Arnold
*Assistant Examiner*—J. P. Ryan
*Attorney, Agent, or Firm*—Cooper & Dunham

[57] ABSTRACT

A reflecting surface which is open at least at one axial end and in an axial section conforms to an axial section through a geometric surface generated by rotating a parabolic curve about an axis normal to the parabola axes. An elongated source/sink extends along the axis of the reflecting surface and is at least partly enveloped by that surface.

23 Claims, 11 Drawing Sheets

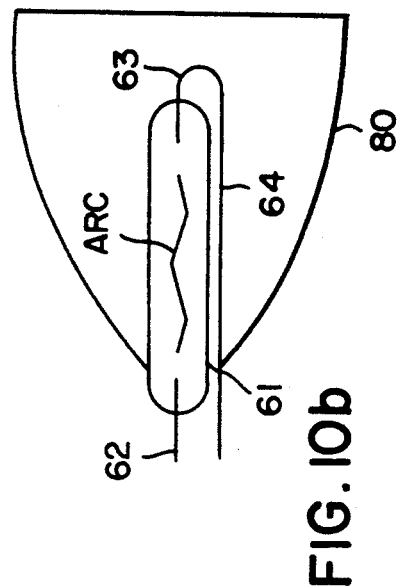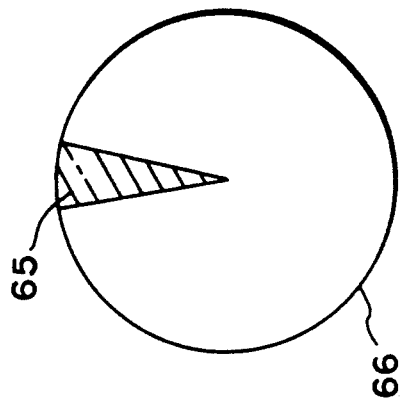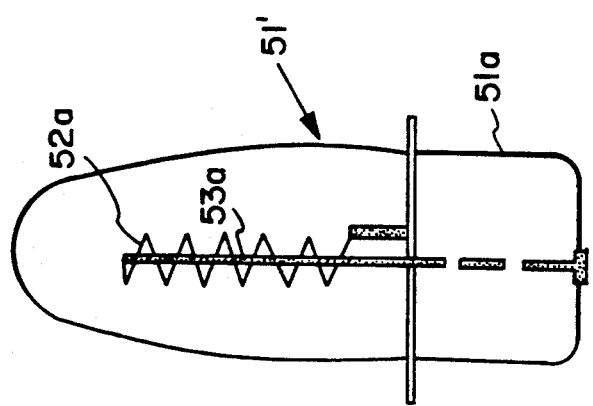

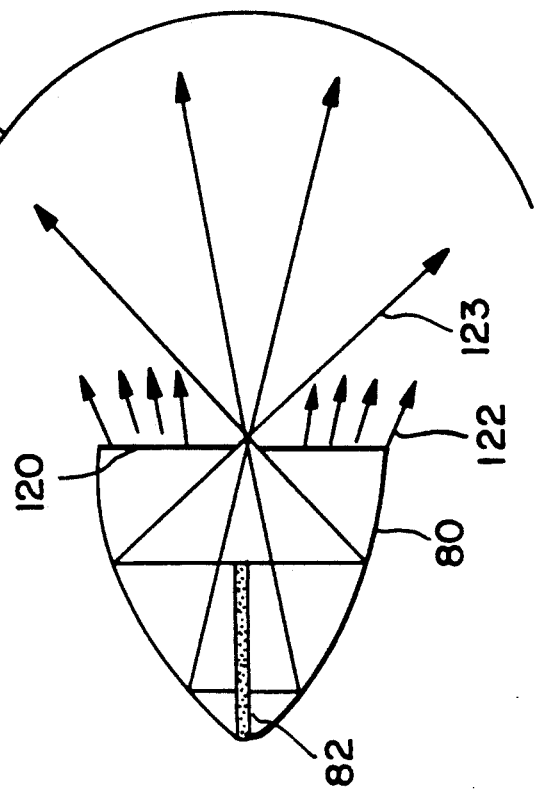
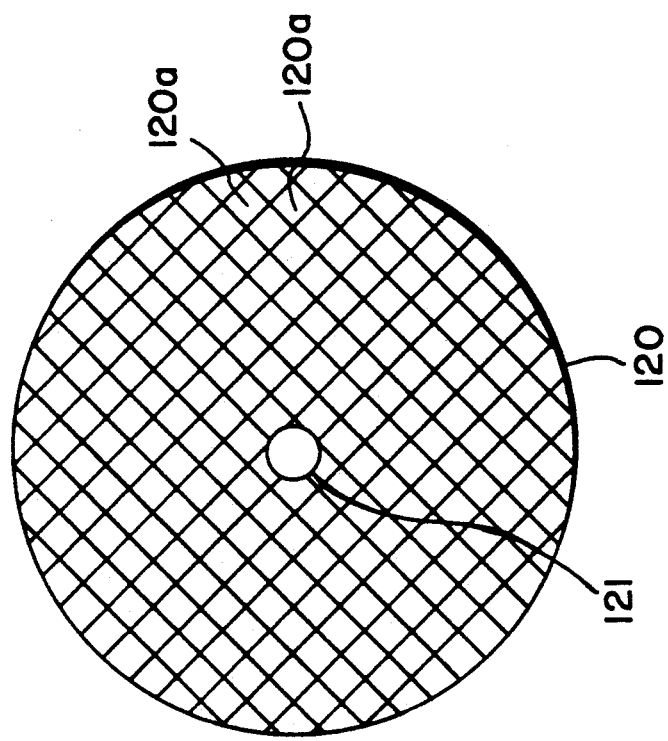
FIG. 15a
FIG. 15b

ORTHOGONAL PARABOLIC REFLECTOR SYSTEMS

REFERENCE TO RELATED APPLICATION

This application is a continuation-in-part of parent application Ser. No. 07/455,518, filed on Dec. 21, 1989 and now allowed, U.S. Pat. No. 5,037,191 granted on Aug. 6, 1991, and hereby incorporates by reference the entire disclosure, drawings and claims of said parent application.

BACKGROUND AND FIELD OF INVENTION

The invention is in the field of devices using reflectors and specifically pertains to the use of a uniquely shaped reflector in emitting and receiving electromagnetic, light, heat or sonic energy.

BACKGROUND OF THE INVENTION

The cited parent application describes a reflector which can be called a COPAR (Cheng Orthogonal Parabolic Reflector) device and can focus a linear source to a small point and, conversely, can map a small point onto a linear sink. Prior art reflectors generally only map between an image and a point such that if a point source is at the focal point of a traditional parabolic reflector, it is mapped to a point at infinity.

While the COPAR device disclosed in said parent application has many useful features, additional features have been devised since and have led to an improved COPAR device and improved combinations using the COPAR device. The objects and advantages of such improvements and new features include:

a) Diffusion of a tight focus to a finite size diffused image;

b) More efficient use of the energy from a linear source which has been reflected by the COPAR device;

c) New configurations of light or other radiation sources providing additional advantages to the COPAR device;

d) The use of the COPAR device in combination with a radiation source such that the combination exhibits certain laser source properties;

e) The use of the COPAR device as a more efficient fiber-optics source of light or other energy;

f) The use of the COPAR device as an imaging system;

g) Providing a new light source using heating filaments interacting with the COPAR device;

h) Providing a new light source using a gaseous discharge lamp in a COPAR device; and i) Using the COPAR device in a two-dimensional form in order to map between a surface source/sink and a linear focal line.

BRIEF DESCRIPTION OF THE DRAWINGS

FIG. 1a illustrates a COPAR (Cheng Orthogonal Parabolic Reflector) with a linear light source such as xenon lamp which is at the axis of the COPAR device and FIG. 1b illustrates an image formed with the device of FIG. 1a.

FIG. 2a illustrates a faceted COPAR device and FIG. 2a illustrates an image formed with the device of FIG. 2a.

FIG. 3a illustrates a COPAR device combined with an optical lens and FIG. 3b an image formed with the device of FIG. 3a.

FIG. 4 illustrates a lens and a lens holder for use in the device of FIG. 3a.

FIG. 9 illustrates a new linear filament light bulb for use in the COPAR device.

FIG. 10a illustrates a COPAR device using a conventional linear xenon lamp and FIG. 10b illustrates an image formed with the device of FIG. 10a.

FIG. 15a illustrates a COPAR device using a diffusing filter and FIG. 10b illustrates an image formed with the device of FIG. 15b.

FIG. 16 illustrates a copar device combined with another reflector.

DETAILED DESCRIPTION OF PREFERRED EMBODIMENTS

Figure 1B:
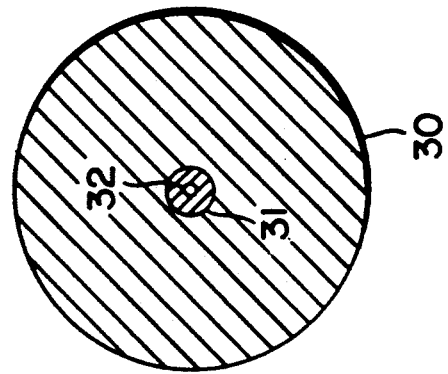
Figure 1A:
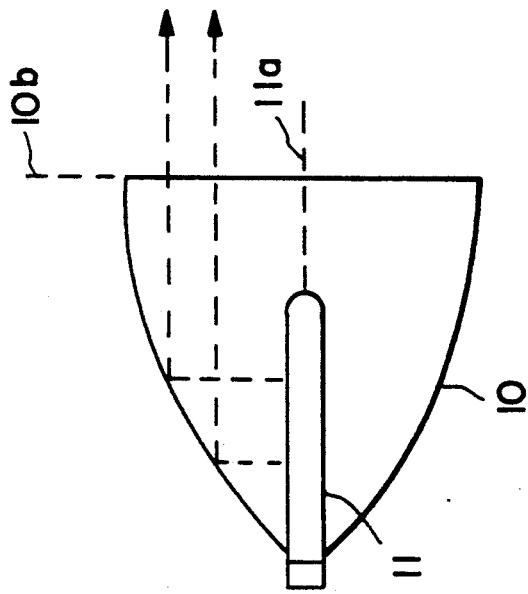

FIG. 1a illustrates a COPAR device in which a parabolic reflector surface 10 shaped as set forth in said parent application envelopes a linear light source 11. Source 11 can be, for example, a linear xenon flash lamp. FIG. 1b illustrates an image which is formed by the device of FIG. 1a and comprises a small geometric focus 32 at which the incident light is at greatest intensity, a circular diffused focal area 31 at which the incident light is intense but less so than at focus 32, and a larger area 30 at which the incident light is considerably less intense. The light at focus 32 and at diffused focal area 31 is mainly due to reflections from reflector 10 of light rays emitted from light source 11 in "primary" directions, i.e., directions perpendicular to axis a of source 11. Area 31 is larger than area 32 because imperfections in the reflecting surface 10 cause some diffusion. The light at the larger area 30 is mainly due to reflections from reflector 10 of light rays emitted from source 11 in "secondary" directions, i.e., directions which are not perpendicular to axis a of source 11. Consistent with this terminology, the light at area 30 can be called the secondary image. One example of an image such as that in FIG. 1b can be formed with a linear xenon flash light 11 on light sensitive paper placed at plane 10b. The light intensity at geometric focus 32 can be high enough to often burn the recording paper. The light at diffused focal area 31 can often be intense enough to show damage to the paper.

The image illustrated in FIG. 1b was formed by using a polished spun aluminum COPAR device reflector and a xenon lamp 11 as a linear source. As described in the parent application, the geometric focus 32 is extremely small. Typically a single flash will burn a tiny hole no bigger than about 0.25 mm in diameter on the paper at geometric focus 32. Geometric non-uniformity and surface imperfections of reflector 10 combine to make the diameter of diffused focal area 31 a few millimeters. However, the light at area 31 can also be intense enough to burn the paper and can be several orders of magnitude more intense than at secondary image area 30.

Figure 2A:
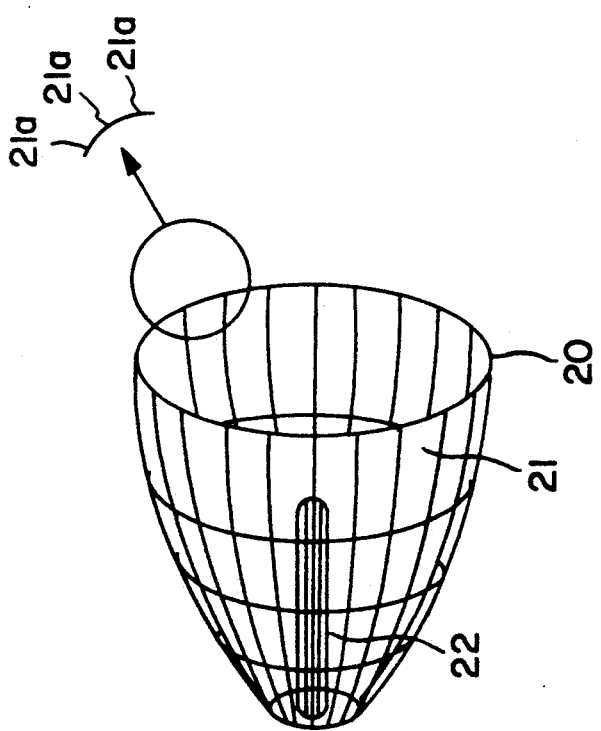
Figure 2B:
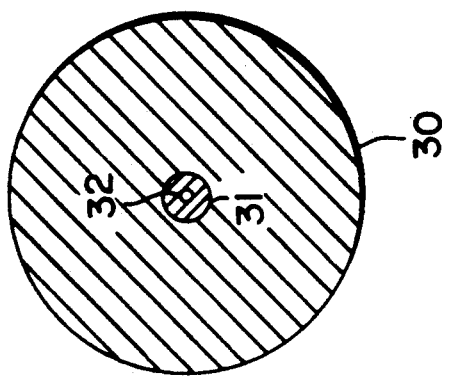

FIG. 2a illustrates a faceted COPAR reflector 20 which has facets 21, say, 20 to 30 in number. Several facets a are illustrated in the inset. Linear light source 22 extends along the axis of reflector 20. The image which this device can produce is illustrated at FIG. 2b and has a similar distribution of a secondary image area 30, a larger diffused focal area 31 as compared with FIG. 1b and a geometric focus 32. The facets tend to make the light incident at the image plane or other surface more diffuse and controllable, giving the image an effect somewhat similar to that from passing the light through ground glass. The control over intensity at the image plane or other surface, e.g., at area 31, can be extremely useful when it is not required to produce an extremely small area 31, as in the case of some projection and other applications. In one example of a faceted reflector 20 in accordance with the invention, a circle can be drawn in a plane normal to the long axis of reflector 20 such that each line at which a facet intersects that plane is half inside the circle and half outside the circle and the angles between the lines in that plane are the same. All such circles conform to the COPAR reflector surface set forth in said parent application.

Figure 3B:
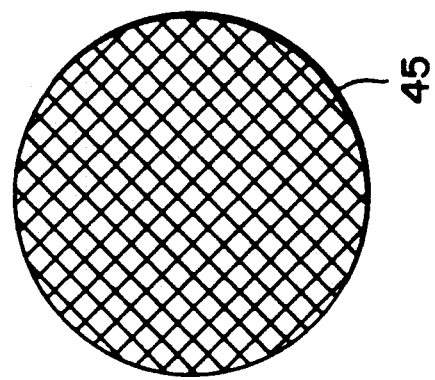
Figure 3A:
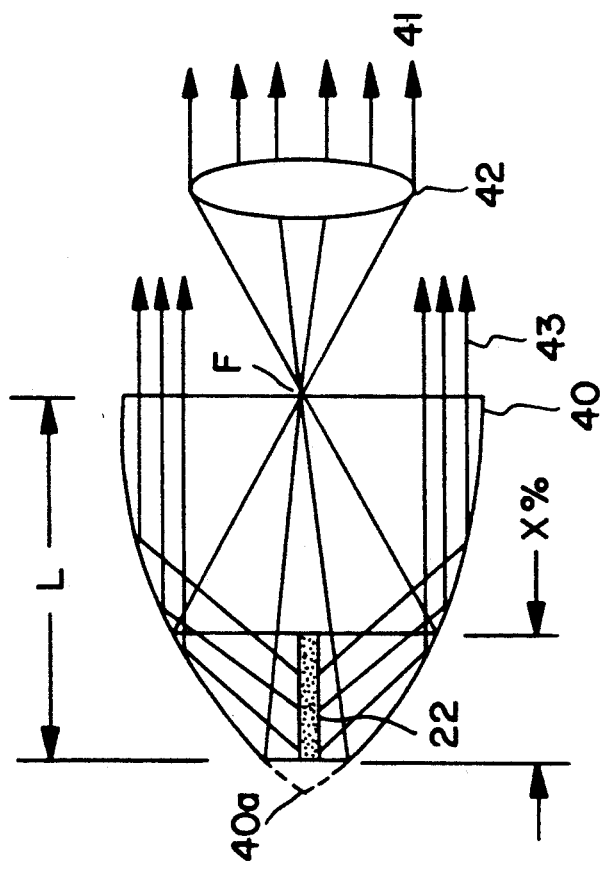

FIG. 3a illustrates a typical configuration of a COPAR device using a lens 42. Reflector 40 has a diameter L at its large open end and a length which also is L and envelopes a central light source 22 as in FIG. 2a. It has been discovered that if light source 22 extends only to within 22% of L from virtual vertex 40a of reflector 40, the device of FIG. 3a still focuses the light reflected from the deep interior of reflector 40 at a focus F (which corresponds to focus 32 and focal area 31 in FIGS. 1b and 2b) but, in addition, forms parallel reflected rays 43 at the extreme angles at the forward part of reflector 40. Using this newly discovered property, it has been discovered that the light intensity in the axial direction of the image illustrated at FIG. 3b can be augmented by using a lens 42 to make parallel the rays forming the primary image at focal spot F, i.e., to produce additional parallel rays 41. These parallel light rays 41 together with the peripheral parallel rays 43, produce a uniform and intense light beam 45 having a circular cross-section or a circular image 45. The distribution of light intensity in beam or image 45 can be changed by changing the portion of the axial distance of L occupied by light source 22. This discovery and this configuration have been used as a means to control and to de-focus light beam or image 45.

Figure 4:
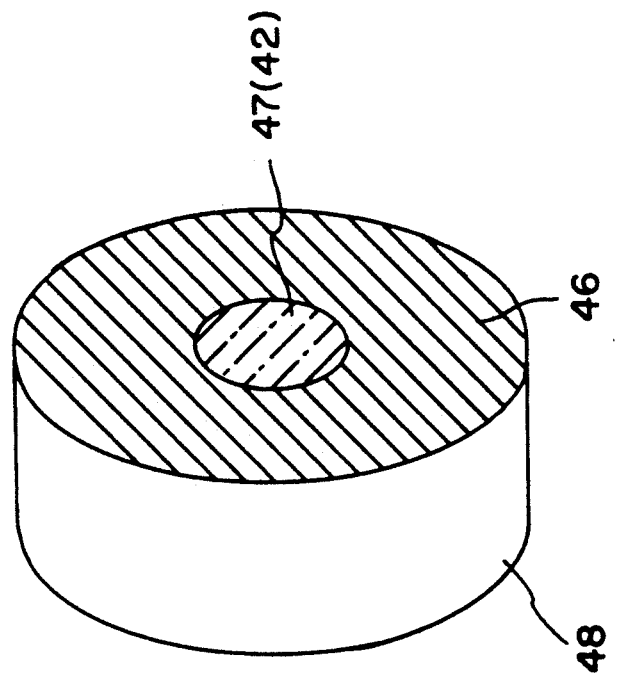

FIG. 4 illustrates a lens system for a lens 47 (e.g., lens 42 of FIG. 3a), using a transparent lens holder 48 with a stand-off distance for the focal lens of lens 47 such that the focal point of 47 will coincide with the focal point F of reflector 10 (FIGS. 1a and 2a) or 20 (FIG. 3a), and the secondary light can be controlled by shaping area 46 into either a concave or convex lens or into multiple curvatures, as desired for a particular application. Holder 48 and lens 47 can be integrally formed, e.g., of a single piece of molded or otherwise shaped plastic material, or can be assembled from a separate lens 47 and a separate holder 48.

Figure 5:
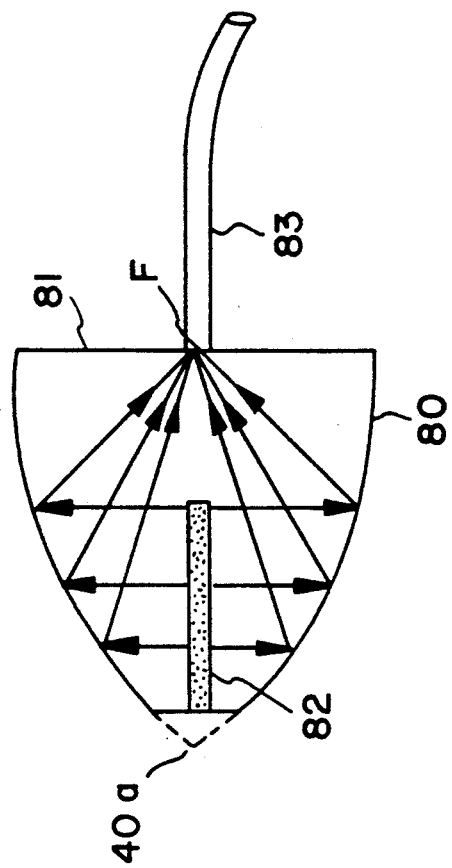
FIG. 5 illustrates the application of the COPAR device in a fiber-optics system.

FIG. 5 illustrates a COPAR device comprising a linear light source 82 in a reflector 80, but in this case the open end of reflector 80 is closed by an internally reflecting mirror 81 which has a central opening at F and thus serves as a spatial filter as well. The reflected light is tightly focused at a controllable angle into a fiber optics strand or bundle 83, passing through the central opening at F of spatial filter and mirror 81. The filter and mirror 81 reflects secondary light (i.e., light which is not focused at F), which secondary light can be reflected back and forth by filter and mirror 81 and reflector 80 until it enters fiber optics strand or bundle 83.

Figure 6:
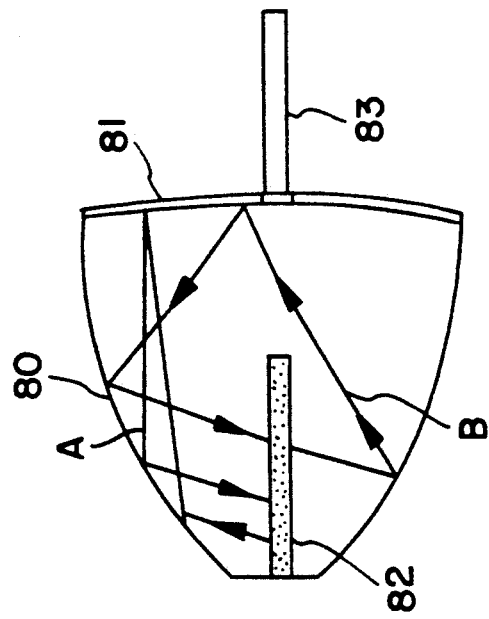
FIG. 6 illustrates an internal energy preserving mode for a COPAR device application.

FIG. 6 is similar to FIG. 5 but uses a curved filter and mirror system 81 and is capable of generating two types of rays in addition to those perpendicular to the length of light source 82. One type is secondary rays such as ray A which come from the part of linear light source 82 which is within 22% of L from virtual vertex 40a (see FIG. 3a) and are reflected toward mirror 81 by reflector 80 and then are reflected back from mirror 81 and again by reflector 80 back to linear light source 82. The second type comprises rays such as ray B which come from the part of linear source 82 that is outside of 22% of L from vertex 40a; these secondary rays also are reflects from the reflector 80, then from mirror 81, then again from reflector 80 and also come back to linear source 82. In this manner, at least a substantial part of the energy of these secondary rays (of the type of rays A and B) comes back to linear light source 82; in the example of using a filament-type light source, the energy reflected back to the filament tends to add heat to the filament and emit more light. The system has some of the characteristics of a laser light source, e.g., in that only light rays which linear light source emits perpendicularly to its axis are taken out as the output energy from the light source, which output energy goes, e.g., into a fiber optics cable 83. The rest of the light rays are being kept within the cavity to keep the source at an excited state. The system could be characterized as a random light laser system where the light is not coherent but exits in the system only at the desired direction and at the desired location and other light energy tends to be kept within the system.

Figure 7:
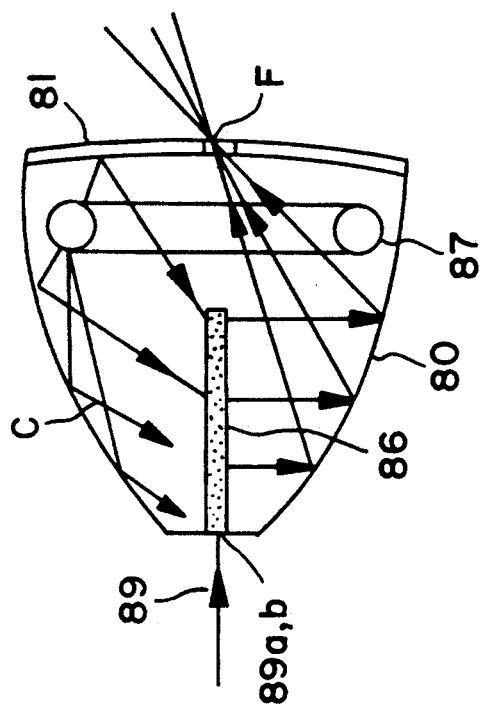
FIG. 7 illustrates a laser configuration for the COPAR device.

FIG. 7 illustrates another example of a COPAR device exhibiting certain laser source properties. A laser source in the form of an axially extending rod 86 can be a YAG lasing source. Light rays that source 86 emits perpendicular to the axial direction are reflected by reflector 80 toward focal point or area F. A donut-shaped light source 87 also is inside reflector 80 and is co-axial therewith. Source 87 can be a Xenon light or an Argon light or some other suitably shaped light source; the light that it emits need not be directional. Reflector 80 and the reflecting inner surface of mirror 81 (which has a central aperture to allow exit of the light focused at F) reflect the light from source 87 such that it impinges on lasing rod 86 to thereby add pumping energy to lasing rod 86. A modulating signal which can modify the lasing properties of lasing rod 86 is supplied at 89. For example, this modifying signal can be fed to lasing rod 86 by means of a photo-electric coating 89a on a piezoelectric crystal 89b. When modulated light impinges on this coating 89a, the resulting electric potential modulates the size and/or shape of piezoelectric crystal 89b and since this crystal is acoustically coupled to lasing rod 86, the resulting acoustic waveform modulates lasing rod 86 and therefore the laser light it emits. Note the auto correlation property of the COPAR device due to the fact that the light focused through a small pinhole at F in spatial filter/mirror 81 is the light which lasing rod 86 has emitted in directions normal to its length and which has travelled to the pinhole along equal path lengths and therefore should be spatially coherent except as affected by imperfections in the reflected surfaces. If light energy emitted in directions normal to the length of lasing rod 86 has the same frequency and the same phase angle, it will have the same amplitude in time and will arrive at the same time at the focal point. Out of phase energy should substantially cancel out even if it arrives at the focal point at the same time. If a dichromatic coating is provided on reflector 80 and mirror 81 for reflecting a selected light wavelength, and light source 87 provides light continuously, the lasing COPAR device of FIG. 7 will output through the pinhole at F only or at least mainly the light which is in the correct wavelength band and is coherent at the focal point F. This lasing action can take place with an outside source as well as an internally radiating source because the auto correlation aspect of the device of FIG. 7 will collectively intensify the high intensity beam exiting the pinhole at F.

Figure 8B:
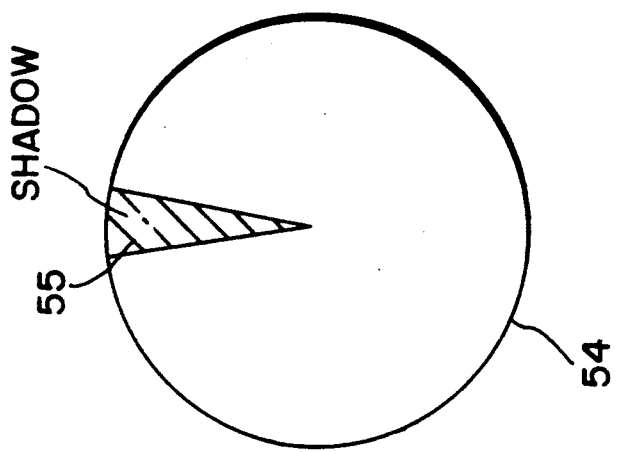
FIG. 8a illustrates an ordinary linear filament bulb in a COPAR device and FIG. 8b illustrates a light image of the filament bulb with the shadow of the filament support.
Figure 8A:
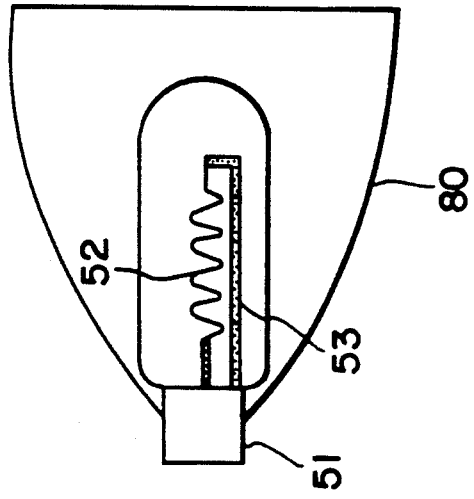

FIG. 8a illustrates a COPAR reflector using a linear tungsten halogen lamp 51. Within the tungsten lamp there is a tungsten filament 52 supported on a supporting element 53. The COPAR device of FIG. 8a projects light into a large area 54 (FIG. 8b) which, however, tends to include a sector-shaped shadow 55 due to the supporting element 53.

FIG. 9 illustrates a new design of a long filament light bulb 51a which can serve advantageously in a COPAR device. Filament 52a is centrally supported by support 53a. This eliminates a shadow such as at 55 in FIG. 8b from the beam of a COPAR device using a bulb such as 51' in FIG. 9 in place of bulb 51 in a device such as in FIG. 8a. A COPAR device using the lamp of FIG. 9 takes advantage of the imaging properties of the COPAR reflector. In typical lamps, if the lamp filament is sufficiently hot to radiate light, then the radiation energy will also heat the filament supporting rod. Normally this would be considered a detriment to lamp design. In order to overcome this detriment, the supporting rod in prior art approaches has been considerably thicker than the filament and has been made of a very high melting temperature material such as tungsten. Due to the requirement of heat conduction of the central rod, copper tungsten and other high melting temperature material can be used as a supporting rod. However, in a lamp such as 51' in FIG. 9, rod 53a can be only a slightly larger diameter tungsten rod than the long filament 52a surrounding rod 53a. Filament 52a can be a smaller diameter tungsten wire having higher resistivity than rod 53a; therefore, when current is passing through, the resistivity of the outside spiral filament will continue to climb. The resistivity of the center rod will remain relatively low and the majority of energy will be soaked up by the outside spiral. The lamp can be used in vacuum, halogen and many other gases such as krypton and xenon and can be used as a large or a small light source.

FIG. 10a illustrates a COPAR device using a different type of a linear light source, namely, a discharge light source 61 using arc or glow discharge and comprising electrodes 62 and 63 and a return current wire indicated by 64. The light beam (or image) from such a light also has a shadow such as illustrated in FIG. 10b which shows the beam cross-section (or image) 66 having a sectoral shadow 65.

Figure 11:
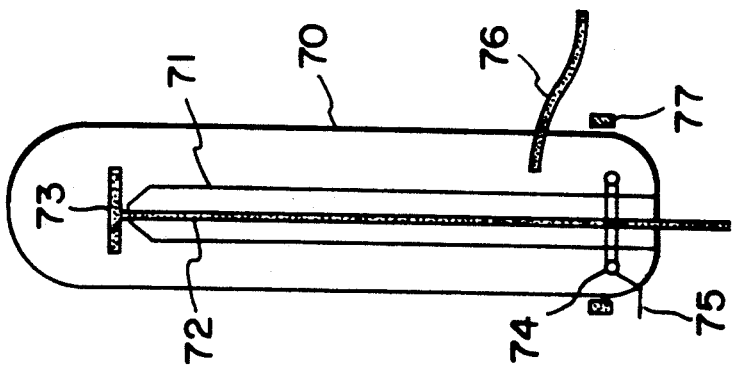
FIG. 11 illustrates a linear concentric discharge lamp for use in the device of FIG. 12.

FIG. 11 illustrates a lamp 70 which is a new type of a discharge lamp for use as a linear light source in place of lamp 64 in a COPAR device such as illustrated in FIG. 10a. Lamp 70 can be a xenon flash lamp having a center electrode 72 surrounded by a quartz or glass insulator 71 and capped by a flat or hat electrode 73. A ring electrode is provided within an outer envelope 70 filled with a gas such as xenon, argon or neon. A grounding lead 75 is connected to ring electrode 74. When there is a sufficient potential difference between hat electrode 73 and ring electrode 74, lamp 70 can be triggered to light up by providing "tickler" voltage either through a trigger wire 76 which extends into the outer envelope of lamp 70 or, alternately, by applying such a voltage to an outer trigger ring 77. Such a discharge lamp may be called an inverse Z-pinch in plasma discharge terminology; in such a lamp the current flowing through center electrode 72 produces a magnetic field which will generally repel the discharge current from the electrode from 73 to 75 such that the hot discharge plasma would not touch the outer wall of the central insulating glass 71 due to the repelling force of the magnetic field. If the envelope 70 is made large enough, the discharge will be confined within a cylindrical sheet of the discharge tube without touching any wall. Such a lamp does not generate a shadow such as that illustrated at 65 in FIG. 10b.

Figure 12:
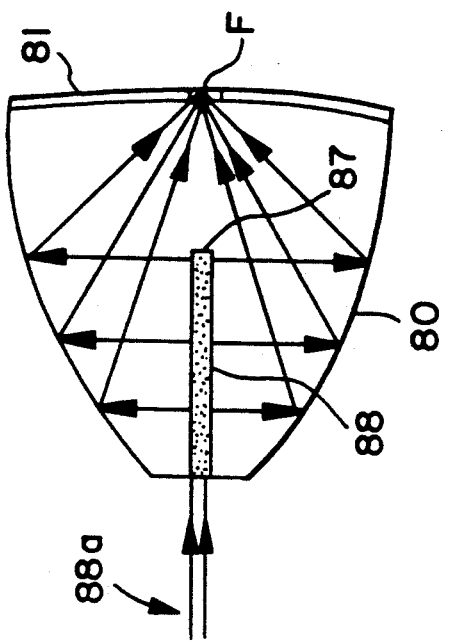
FIG. 12 illustrates a COPAR device using a laser light source for applications such as auto correlations.

FIG. 12 illustrates a COPAR device in which energy such as in the form of a light beam 88a is pumped into a lasing rod 88 to cause the rod to emit light including light in directions perpendicular to the long axis of the rod. The COPAR device is otherwise similar to that of FIG. 7 and uses a reflector 80 and spatial filter/mirror 81 having a pinhole at focal spot F. In the device of FIG. 12, only light emitted from lasing rod 88 in directions normal to its long axis leaves through the pinhole at focal spot F, in the form of light which tends to be time and space correlated. Light which is not so correlated tends to be reflected back to lasing rod 12 by the mirror 81 or to cancel out.

Figure 13:
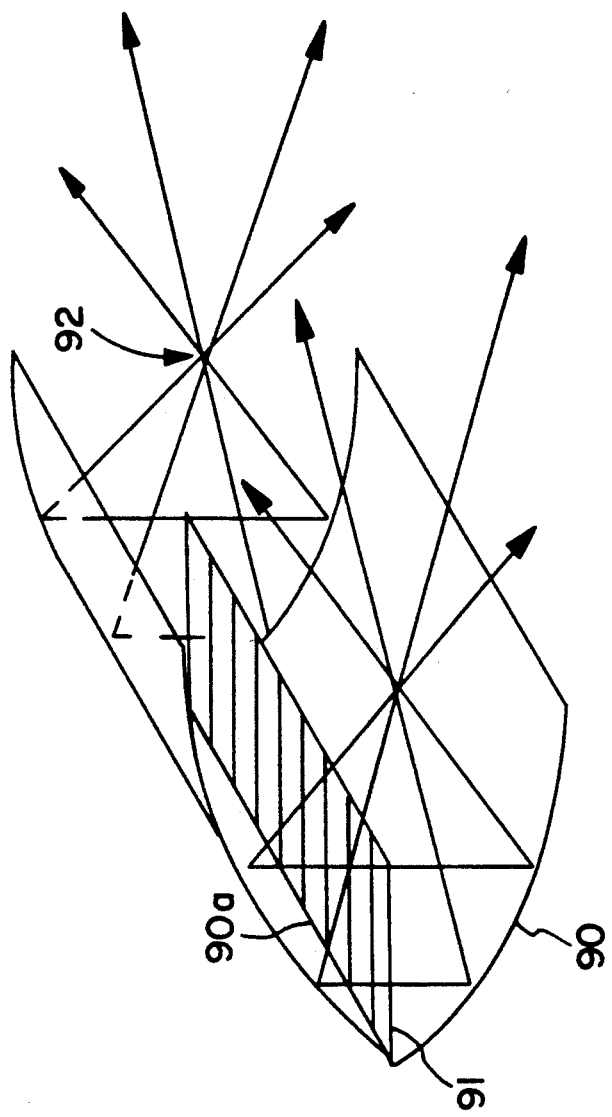
FIG. 13 illustrates a new COPAR device configuration using a two-dimensional surface source (or sink) rather than a linear source (or sink).

FIG. 13 illustrates a two-dimensional COPAR device configured such that a light source 91 is in the form of a plane at the mid-section of a reflector 90 which focuses to a focal line 92 the light emitted by source 91 in directions normal to the plane of source 91. In section normal to the vertex line 90a, reflector 90 has the same shape as a section along the axis of a reflector such as 10 in FIG. 1. Light source 91 can be a heated sheet or a collection of closely spaced heated filaments. As illustrated, the light emitted perpendicularly to the plane of source 91 tends to focus at a focal line 92 and the light emitted from any two points of source 91 which are spaced from each other only along the direction of vertex line 90a tends to travel as parallel rays.

Figure 14:
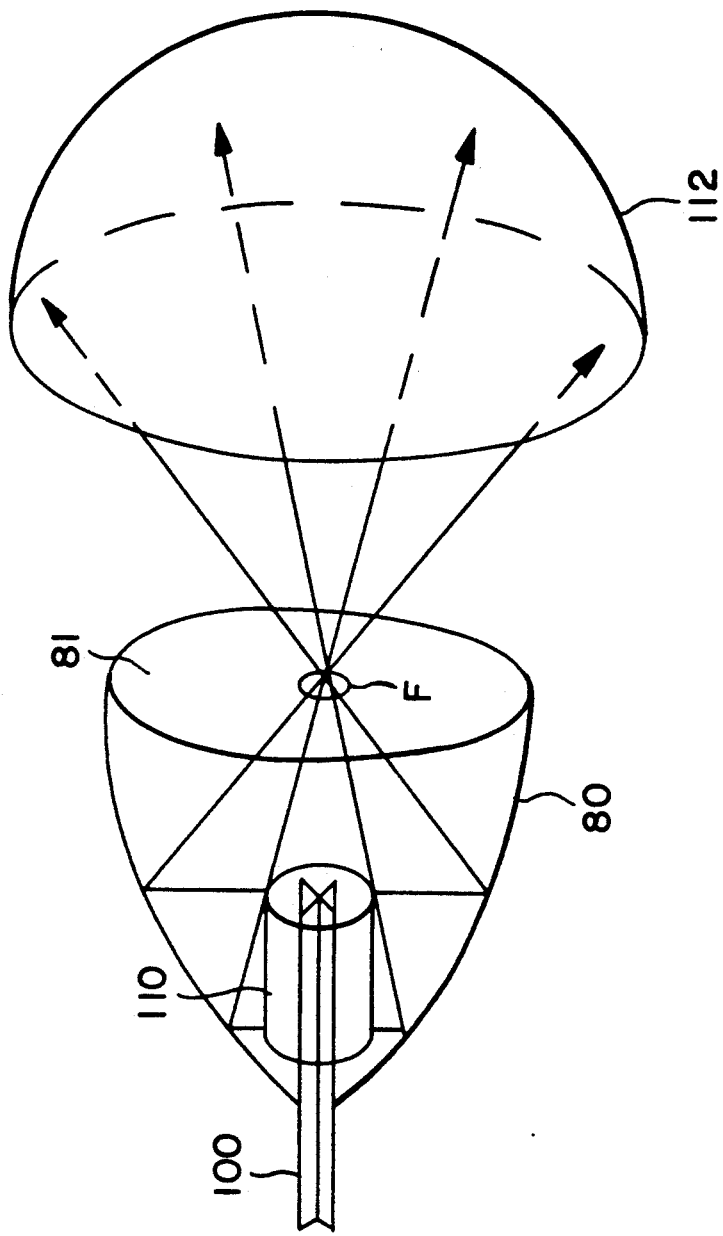
FIG. 14 illustrates an imaging system using a COPAR device projecting onto a hemisphere screen.

FIG. 14 illustrates a COPAR device used to project a photographic slide 110 which has been formed into a cylinder onto a hemispherical screen 112. While typically screen 112 would be much larger than reflector 80, for ease of illustration it has been shown as similar in size. When light emitted from an axially extending light source 100 in directions normal to the axis of source 100 passes through a film slide 110 formed into a cylinder which is coaxial with and surrounds source 100, the image focused onto a pinhole at focus F in the manner earlier discussed forms an ideal point source that projects the film image onto hemisphere screen 112 which is centered at focal spot F. The illustrated projection system can give a spatial correlation between film 110 and screen 112. If two COPAR devices of the type illustrated in FIG. 14 are close to each other and a large screen 112 is used such that the geometric center of the screen hemisphere is close to the focal pinholes F of the two devices, and the two projection devices project the same film slide, an image can be projected on the screen that would appear to a viewer to be three-dimensional. If the projection devices are correlated in the linear or laser fashion discussed above, a holographic image of two different spatial locations can be configured into a three-dimensional holographic image or at least an image which so appears to a viewer.

A typical application of a COPAR device is in photographic lighting. It has been found that if a wide angle close-up picture is desired, the light focuses to a point, then redistributes as a solid angle emitting from a point source which coincides with the point sink as the camera lens sees the scene. The lighting provided by a COPAR device is particularly uniform. As described, the secondary light can enhance the light beam provided by the COPAR device. In fact, a diffusion filter 120 can be used as illustrated in FIGS. 15a and 15b, which can be similar to the type of diffusion filters used with overhead fluorescent lights. As is common with such diffusers used in different devices, diffuser 120 has a grid of ribs 120a that scatter the light but has a central aperture 121 with a diameter that is on the order of a few percent (typically about 1%) of the total surface area of diffuser 120. The primary, spherically distributed rays are depicted at 123, and the diffused rays at 122.

The Cheng Orthogonal Parabolic Reflector is believed to be an important advance in optical imaging and light projection and signal receiving, as well as for acoustic reflection and imaging. While the above disclosure depicts certain typical configurations of the reflector and some new types of light sources that are particularly advantageous for use in the invention, as well as some new uses of the concept, it only provides an illustration of some of the currently preferred embodiments of this invention. Of course, many other embodiments and advantages are within the scope of the invention. The optical features of the laser properties of some embodiments of the invention, such as auto correlation of the time base with space correlation, can be particularly important in fiber optical applications, both in illumination and for communication applications. One useful configuration in this regard can comprise a fraction of the reflector used in a system for image projection of a film. In such a case, a half of the Orthogonal Parabolic Reflector can be used to reflect light in the manner discussed above, e.g., in connection with FIG. 14 while the other half can be left open to feed film through and for mechanical arrangements. In the case of a linear light bulb, the center body to support a filament has to be a high temperature material such as tungsten, and such a supporting system can be desirable for imaging purposes. If the application is only as a light source which produces an intense point light source at the focal point, then the requirement of such a light bulb may not be necessary.

A COPAR device can be combined with another reflector, such as a parabolic, elliptical or spherical reflector, to form a unified structure benefitting from the properties of both types of reflectors. For example, as illustrated in FIG. 16, light of other energy emitted from a COPAR device 80 (having a source/sink 86) can be directed to another reflector 126 and/or 128, which can be parabolic, elliptical or spherical, and can be further reflected by this second reflector 126 and/or 128 as needed. Conversely, light or other energy reflected from a parabolic, elliptical or spherical reflector can be directed to a COPAR device to be mapped onto a line sink in the manner discussed above. For example, referring to FIG. 15a, a parabolic reflector can take the place of the item labeled "spherical" to reflect light delivered thereto from the COPAR device or to reflect onto the COPAR device light from another source.

Any long radiation source that does not have parts casting significant shadows can be used to advantage as the light source of a COPAR device. For example, the discharge lamp illustrated in FIG. 10a has a return current wire 64 which casts a shadow as illustrated in FIG. 10b. However, the shadow can be substantially eliminated by recessing the return current wire in the glass envelope forming the discharge light source 61, particularly if the return wire is in the form of a conductive coating on said glass envelope.

I claim:

1. A structure comprising:
   a reflecting surface which has an axis and is open at least at one axial end and in an axial section generally conforms to an axial section through a surface generated by rotating a portion of a parabolic curve about an axis perpendicular to the axis of the parabola defined by said curve; and
   an elongated source/sink which extends at least in the direction of said axis of said reflecting surface and is at least partly enveloped by said reflecting surface.

2. A structure as in claim 1 in which said reflecting surface envelopes said source/sink in all radial directions.

3. A structure as in claim 2 in which said reflecting surface is faceted.

4. A structure as in claim 3 in which in a radial section the facets of said reflecting surface conform to lines which intersect a circle at angles relative to a tangent to the circle at the point of intersection such that all angles between such lines and such tangents are equal to each other.

5. A structure as in claim 2 in which the source/sink comprises a source which extends over a selected range of distance relative to the vertex of said reflecting surface such that said reflecting surface reflects a subset of the energy emitted from the source in the form of parallel rays which in a radial section occupy an annulus coaxial with the axis of said reflecting surface.

6. A structure as in claim 5 including a lens which is coaxial with said reflecting surface and is within said annulus and is positioned to make parallel to each other and to the rays within said annulus the rays emitted by said reflecting surface within said annulus.

7. A structure as in claim 2 including a mirror closing at least in part an axial end of said reflecting surface and having an opening at the axis of said reflecting surface, said mirror reflecting back to the reflecting surface and thereby to said source/sink energy that does not leave the structure through said axial opening in said mirror.

8. A structure as in claim 7 in which said mirror is curved such that its concave side faces said source/sink.

9. A structure as in claim 2 in which said source/sink comprises a laser.

10. A structure as in claim 9 including a mirror closing at least in part an axial end of said reflecting surface and having an opening at the axis of said reflecting surface, said mirror reflecting back to the reflecting surface and thereby to said source/sink energy that does not leave the structure through said axial opening in said mirror.

11. A structure as in claim 10 in which said mirror is curved and has a concave side which faces said source/sink.

12. A structure as in claim 9 including a source of pumping energy for exciting said laser in the form of an annular light source coaxial with said laser and positioned between the laser and the curved mirror to emit light which impinges on the laser after reflection from at least one of said mirror and said reflecting surface.

13. A structure as in claim 9 including a modulating element coupled with the laser and adapted to receive a modulating signal from a source outside the structure and apply a corresponding modulating influence on the light emitted by the laser.

14. A structure as in claim 2 in which said source/sink comprises a light bulb which has an axially extending and electrically conductive rod and a filament which is coaxial with and surrounds said rod and also is electrically conductive but is more electrically resistive than said rod.

15. A structure as in claim 2 in which said source/sink comprises an arc discharge light bulb which has electrodes spaced from each other along the axis of said reflecting surface to form a discharge arc therebetween.

16. A structure as in claim 2 in which said source/sink comprises a discharge light source which has a central electrode which extends along the axis of said reflecting surface and is enclosed in an electrically insulating tube and ends in a top-hat tip at one axial end and a return electrode which surrounds the glass tube and is positioned at the opposite axial end relative to the top-hat tip to form an electrical discharge arc between said tip-hat tip and said return electrode.

17. A structure as in claim 2 including a support to position a transparency along a surface coaxial with said source/sink and a hemispherical projection screen which is centered on the focal spot of said reflecting surface.

18. A structure as in claim 2 including a grill positioned at the output side of said reflecting surface to diffuse the light emitted thereby and having a central opening coinciding with the focal spot of said reflecting surface.

19. A structure as in claim 2 in which said source/sink comprises an arc discharge light bulb having an elongated glass enclosure coaxial with the axis of the reflecting surface and a first electrode at one longitudinal end of the enclosure and a second electrode at the other longitudinal end of the enclosure, one of said electrode being connected to a return wire which is in the form of a substantially transparent coating on said glass enclosure, said electrodes being spaced from each other along the axis of said reflecting surface to form a discharge arc therebetween.

20. A structure as in claim 1 including a reflector selected from the group consisting of parabolic, elliptical and spherical reflectors and juxtaposed with said reflecting surface to deliver/receive electromagnetic energy therefrom.

21. A structure comprising:
a reflector which conforms to selected portions of a pair of identical surfaces which have concave sides facing each other and are positioned with respect to each other to intersect at a vertex line which in a section normal to the line is at the vertex of said identical surfaces, each of said identical surfaces generally conforming to a parabola in a section normal to said vertex line; and
a source/sink which comprises a two-dimensional source/sink surface conforming to a plane which includes said vertex line and extends at least partly midway between said selected portions of said identical surfaces.

22. A structure as in claim 21 in which said source/sink is selected from the group consisting of a heated sheet and a collection of closely spaced heated elements.

23. A structure as in claim 21 in which light emitted by said source/sink normal to the plane thereof tends to focus at a focal line which is parallel to said vertex line and light emitted from any two points of said source/sink which are spaced from each other only along the direction of said vertex tends to travel along parallel rays after reflection by said reflector.

* * * * *